(12) United States Patent
Deliz Centeno

(10) Patent No.: US 12,430,021 B1
(45) Date of Patent: Sep. 30, 2025

(54) ROTATION-BASED USER INTERFACE

(71) Applicant: Apple Inc., Cupertino, CA (US)

(72) Inventor: Luis R. Deliz Centeno, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/477,271

(22) Filed: Sep. 16, 2021

Related U.S. Application Data

(60) Provisional application No. 63/082,728, filed on Sep. 24, 2020.

(51) Int. Cl.
| | |
|---|---|
| *G06F 3/0487* | (2013.01) |
| *G06F 3/01* | (2006.01) |
| *G06F 3/0362* | (2013.01) |
| *G06F 3/0482* | (2013.01) |
| *G06F 3/0485* | (2022.01) |

(52) U.S. Cl.
CPC ............ *G06F 3/0487* (2013.01); *G06F 3/013* (2013.01); *G06F 3/0362* (2013.01); *G06F 3/0482* (2013.01); *G06F 3/0485* (2013.01)

(58) Field of Classification Search
CPC .......................... G06T 19/006; G06T 2215/16
See application file for complete search history.

(56) References Cited

U.S. PATENT DOCUMENTS

| | | | |
|---|---|---|---|
| 7,007,246 B2* | 2/2006 | Yamaguchi ............. | G06F 3/033 715/810 |
| 11,158,130 B1* | 10/2021 | Rubaiat Habib ....... | G06F 3/011 |
| 2002/0180799 A1* | 12/2002 | Peck ..................... | G06F 3/0485 715/784 |
| 2006/0001645 A1* | 1/2006 | Drucker ................ | G06F 3/0354 345/156 |
| 2006/0246940 A1* | 11/2006 | Foxenland .......... | G06F 3/04892 455/550.1 |
| 2011/0113486 A1* | 5/2011 | Hunt ................... | G06F 3/04847 726/19 |
| 2012/0102438 A1* | 4/2012 | Robinson ................ | G06F 3/011 715/863 |
| 2012/0229521 A1* | 9/2012 | Hales, IV ............... | F24F 11/58 345/684 |
| 2013/0215148 A1* | 8/2013 | Antonyuk ............... | G06F 3/017 345/633 |
| 2013/0326431 A1* | 12/2013 | Bjorklund ............... | G06F 3/017 715/863 |
| 2014/0232639 A1* | 8/2014 | Hayashi ................. | G06F 3/048 345/156 |
| 2015/0074603 A1* | 3/2015 | Abe ....................... | H04N 21/47 715/823 |

(Continued)

*Primary Examiner* — Gabriel Mercado
(74) *Attorney, Agent, or Firm* — Blank Rome LLP

(57) ABSTRACT

Implementing a rotation-based graphical user interface may include detecting a physical object in an image; presenting the rotation-based graphical user interface in accordance with the detected physical object, wherein input to the graphical user interface corresponds to movement of the physical object; detecting a movement of the physical object; determining a characteristic of the movement of the physical object; initiating a scrolling motion through the graphical user interface in accordance with the movement characteristic satisfying a first criterion; detecting selection of a portion of the graphical user interface; and performing an action associated with the selected portion.

42 Claims, 10 Drawing Sheets

(56) References Cited

U.S. PATENT DOCUMENTS

| | | | |
|---|---|---|---|
| 2017/0199543 A1* | 7/2017 | Rhee | G06F 1/1605 |
| 2017/0329392 A1* | 11/2017 | Keskin | G06F 3/015 |
| 2019/0172266 A1* | 6/2019 | Short | G06V 20/20 |
| 2020/0230482 A1* | 7/2020 | Thornbrue | G06T 7/20 |
| 2021/0224850 A1* | 7/2021 | Richardson | G06F 3/0482 |

* cited by examiner

ROTATION-BASED USER INTERFACE

BACKGROUND

This disclosure relates generally to user interface devices. More particularly, but not by way of limitation, this disclosure relates to techniques and systems for implementing a rotation-based user interface.

Computer mice often include "scroll wheels" to provide rotation-based input for parameter adjustment within a user interface. However, computer mice are difficult to use in conjunction with some types of electronic devices. What is needed is an improved rotation-based user interface for these types of electronic devices.

DETAILED DESCRIPTION

Figure 1:
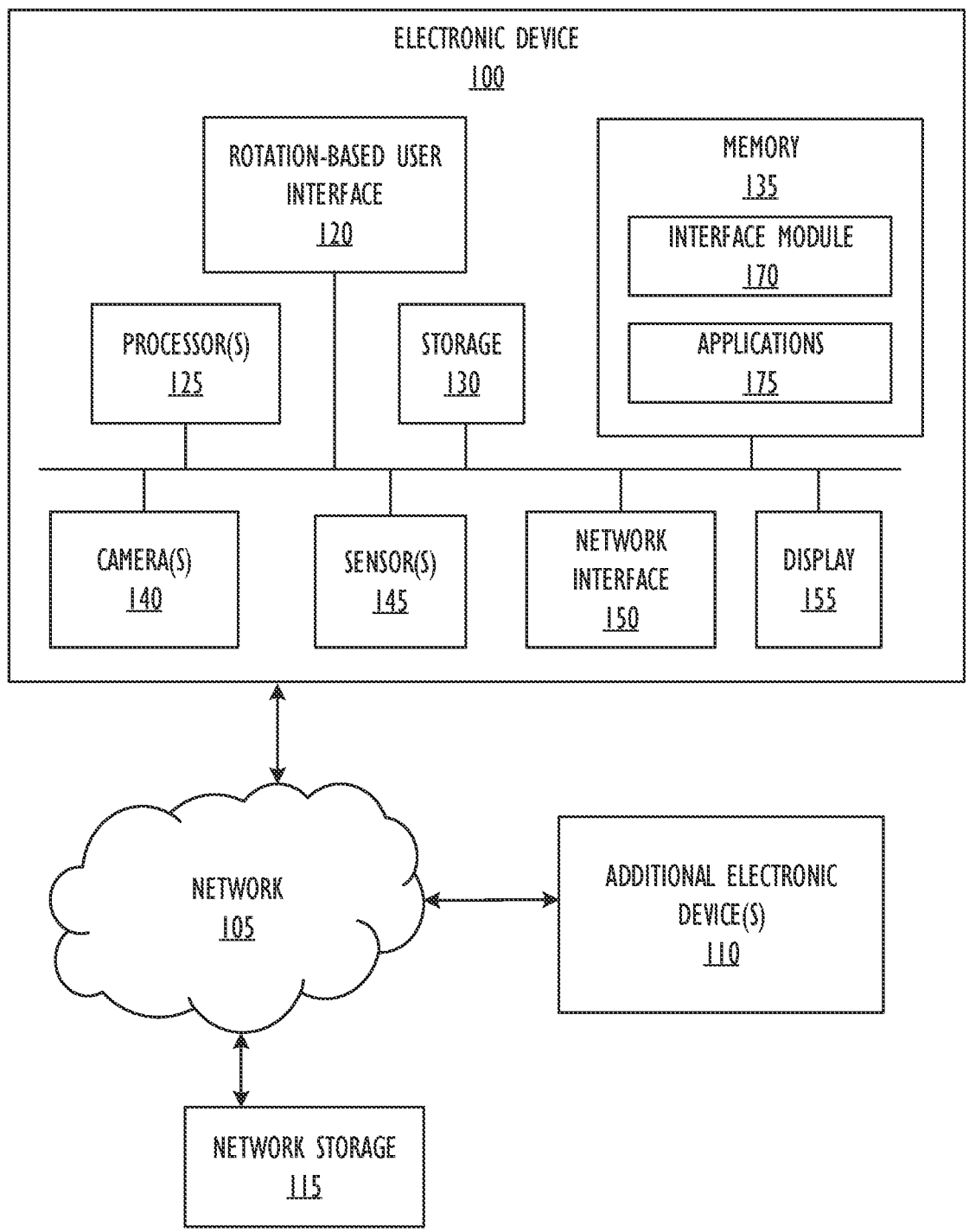
FIG. 1 shows, in block diagram form, an exemplary system according to one or more embodiments.

This disclosure pertains to systems, methods, and computer readable media to implement a rotation-based graphical user interface. To implement a rotation-based user interface, a physical object may be detected in an image. The physical object may correspond to the rotation-based graphical user interface, such that input to the rotation-based graphical user interface corresponds to movement of the physical object. A rotation-based graphical user interface may be presented in accordance with the detected object, and a movement of the physical object may be detected. In some embodiments, the movement of the physical object may be detected by object recognition in a set of images or video data of the physical object. A characteristic of the movement of the physical object may then be determined. The movement characteristic may include a direction of rotation, an angular velocity or speed of rotation of the physical object, an angular acceleration, or the like.

A scrolling motion through the graphical user interface is initiated in accordance with the movement characteristic satisfying a first criterion. In some embodiments, the first criterion represents a threshold speed of rotation, such that in response to the speed of rotation of the physical object being greater than the threshold speed of rotation, the scrolling motion is initiated. In some embodiments, the movement characteristic includes an inertial parameter corresponding to a decay rate for a speed of the scrolling motion. Selection of a portion of the graphical user interface may be detected, such as from a second rotation-based user input, a gesture-based input, a gaze-tracking or gaze-position input, or the like. Then, an action associated with the selected portion is performed.

In some embodiments, a scrolling speed of the scrolling motion is proportional to the speed of rotation of the physical object. In some embodiments, the scrolling speed is limited to a scrolling speed proportional to a second criterion in accordance with the movement characteristic satisfying the second criterion. For example, the second criterion may represent a maximum speed at which a user's vision can follow the scrolling speed. In some embodiments, a second movement of the physical object is detected, and a second characteristic of the second movement is determined. The second movement characteristic may include a second direction of the second rotation. If the second direction is substantially the same as the direction of the first rotation of the physical object, a second scrolling motion is initiated. If the second direction is not substantially the same as the direction of the first rotation, the scrolling motion is stopped.

In some embodiments, presentation of the graphical user interface may be modified in accordance with the movement characteristic. For example, the graphical user interface may include a list. If the scrolling motion reaches the end of the list, presentation of the list may be modified such that the end of the list wraps around to the beginning of the list. The display position of the graphical user interface may be modified based on the movement characteristic. In some embodiments, a display size of a portion of the graphical user interface may be increased if it is within a predetermined distance from a target position and decreased if it is outside the predetermined distance.

Various examples of electronic systems and techniques for using such systems in relation to various technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. It should be understood that the various components and functionality within electronic device 100, additional electronic device 110 and network storage 115 may be differently distributed across the devices, or may be distributed across additional devices.

Electronic Device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including interface module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Electronic device 100 may also include one or more cameras 140 or other sensors 145, such as depth sensor, from which depth of a scene may be determined. In one or more embodiments, each of the one or more cameras 140 may be a traditional RGB camera, or a depth camera. Further, cameras 140 may include a stereo- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for providing state information in order to track an application and system state. According to one or more embodiments, memory 135 may include one or more modules that comprise computer readable code executable by the processor(s) 125 to perform functions. The memory may include, for example interface module 170 for determining rotation-based user input from a rotation-based user interface 120 and provide and manipulate a graphical user interface associated with application(s) 175 based on rotation-based user input through rotation-based user interface 120. For example, the interface module 170 may obtain image or video data from cameras 140 or sensors 145 capturing a rotation-based user input and determine a direction and an angular velocity of the rotation-based user input. The interface module 170 may then determine whether the angular velocity satisfies a first threshold, and if so, may scroll through a graphical user interface associated with application(s) 175 and displayed on display 155 based on the direction of the rotation-based user input and at a speed proportional to the angular velocity. In some embodiments, an object detection module may identify a marker in the image or video capturing the rotation-based user input and track the location of the marker throughout the video. Interface module 170 may obtain the tracked location information from the object detection module to determine the direction and angular velocity of the rotation-based user input.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
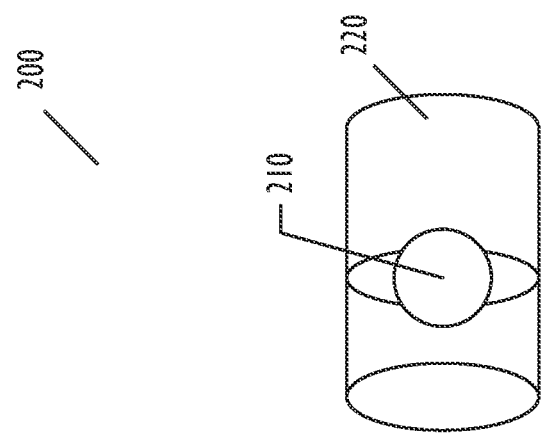
FIG. 2 shows a diagram of an example input device for a rotation-based user interface, according to one or more embodiments.
Figure 2:
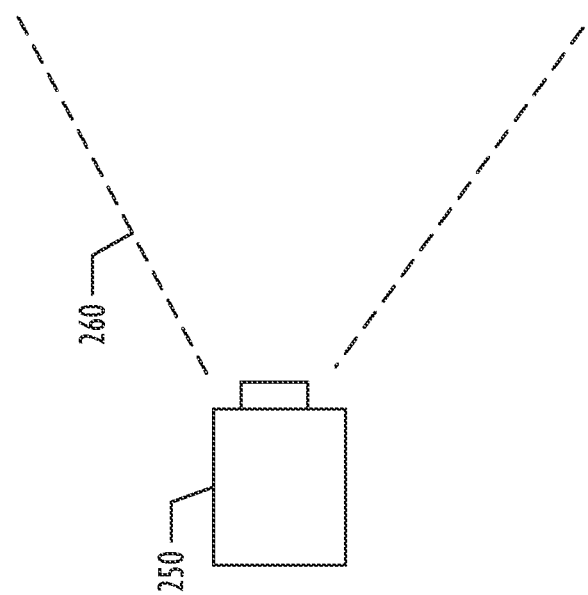

FIG. 2 shows a system diagram of an example input device for a rotation-based user interface, according to one or more embodiments. For ease of explanation, the example input device will be described in the context of FIG. 1. However, it should be understood that the various actions may be taken by alternate components. While pertinent features are shown, those of ordinary skill in the art will appreciate from the present disclosure that various other features have not been illustrated for the sake of brevity and so as not to obscure more pertinent aspects of the example among implementations disclosed herein. In some embodiments, an input device 210 may be placed on a physical object 220 for a rotation-based user interface. The physical object 220 may be rotated to provide input to rotation-based user interface 120. The example input device 210 may include a band having an accelerometer, a gyroscope, or other sensor for determining movement of the physical object 220. For example, input device 210 may include an accelerometer to determine a speed and direction of rotation in response to the physical object 220 being rotated. Rotation-based user interface 120 may obtain the sensor data from input device 210 corresponding to the rotation-based user input and provide it to interface module 170 for further processing.

In some embodiments, object 220 and input device 210 are a single object. In other embodiments, the user may place input device 210 on any appropriate object 220 that may be rotated. In some embodiments, input device 210 may include an RFID tag that may transmit data regarding the movement of input device 210 to rotation-based user interface 120 in electronic device 100 shown in FIG. 1. In some embodiments, input device 210 is a marker identifiable by an object detection module or interface module 170. Camera 250 captures image or video data showing the rotation-based user input, and an object detection module or interface module 170 may identify the input device 210 in the image or video data to determine the direction and angular velocity of the rotation-based user input. In other embodiments, input device 210 may not be used and interface module 170 may instead determine the direction and angular velocity of the rotation-based user input based on the appearance of physical object 220 in the image or video data using computer vision techniques.

A camera 250 has a field of view 260 which includes user input device 210 and physical object 220. The camera 250 is configured to capture one or more images of the physical object 220 and determine a movement characteristic such as speed and direction of rotation of object 220 identified by the rotation-based user interface 120 and rotated by the user as a means of providing input. For example, the camera 250 captures a video of the physical object 220 rotating and provides the video to the interface module 170 or to an object detection module. The interface module 170 or an object detection module tracks the location of the physical object 220 in each frame of the video, and interface module 170 determines a direction and angular velocity of the rotating object. In some embodiments, input device 210 is a marker placed on the object 220 rotated by the user as a means of providing input, such that interface module 170 or an object detection module may track the location of the marker in each frame of the video to determine the direction and angular velocity of the rotation-based input.

Figure 3B:
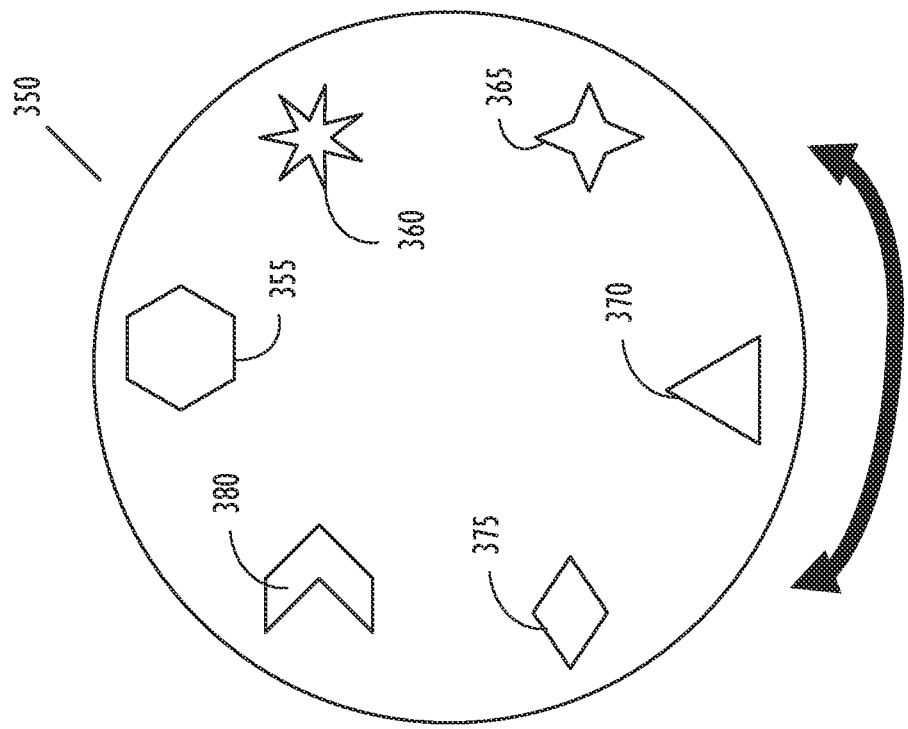
FIGS. 3A-B show diagrams of two example graphical user interfaces manipulated via a rotation-based user interface, according to one or more embodiments.
Figure 3A:
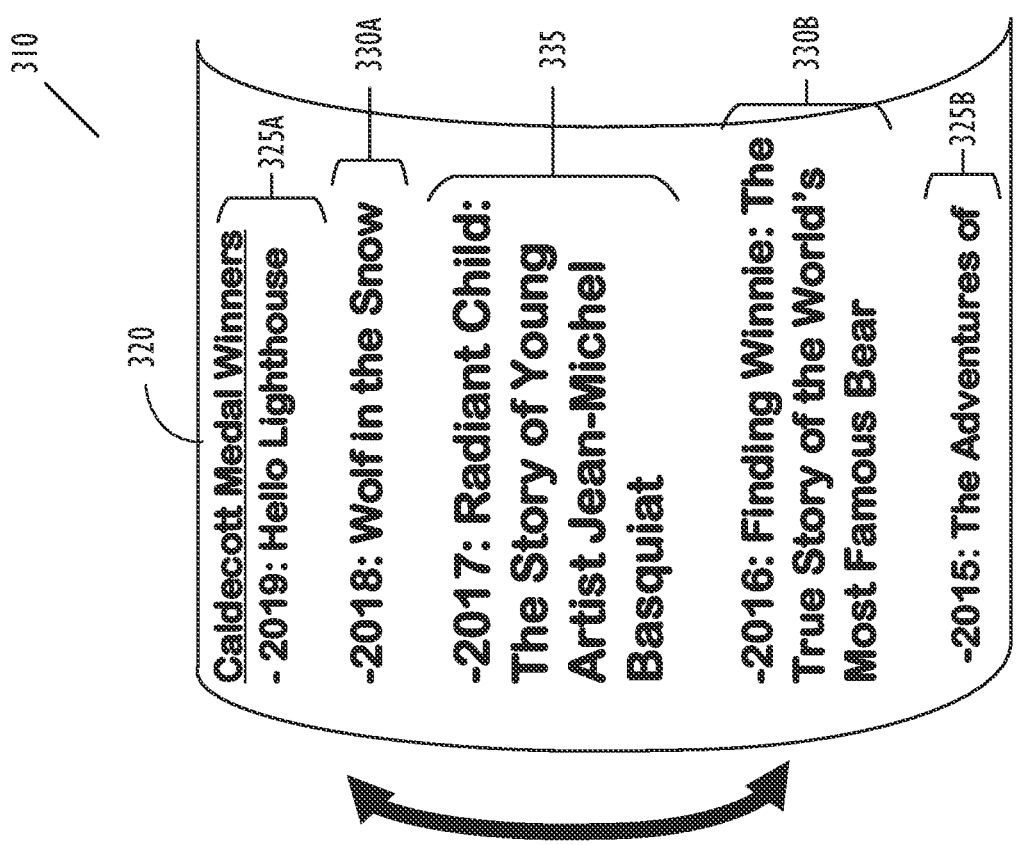

FIGS. 3A-B show diagrams of two example graphical user interfaces manipulated via a rotation-based user interface, according to one or more embodiments. In FIG. 3A, a graphical user interface 310 shows a list 320 of Caldecott medal winners. The graphical user interface 310 changes the text size of items on list 320 based on their location from a cursor position, a gaze position, a position within list 320, or the like. For example, list item 335 at the gaze position, cursor position, or central position within list 320, has a larger text size than list items 325A-B and 330A-B which are a predetermined distance from the gaze, cursor, or central position. The list items 325A-B farthest from the gaze, cursor, or central position have a smaller text size than list items 330A-B and 335. In some embodiments, rotation-based user input may cause the graphical user interface 310 to scroll through list 320, such that different list items are displayed on graphical user interface 310, and cause graphical user interface 310 to update the text size of list items accordingly. In some embodiments, rotation-based user input may cause the graphical user interface 310 to change the display position of list 320, such that list 320 appears at eye level for example. In FIG. 3B, a graphical user interface 350 shows a wheel of application icons 355-380. The graphical user interface 350 may rotate the application icons 355-380 similar to a lazy Susan turntable in response to a rotation-based user input. For example, the graphical user interface 350 may rotate the application icons such that the triangle-shaped icon 370 is at a twelve o'clock position and the hexagon-shaped icon 355 is at a six o'clock position. In some embodiments, a particular position in the wheel of application icons may be a selection position, such that an icon in the selection position may be selected via a user input. Graphical user interface 350 may increase a display size of the icon in the particular position.

Figure 4:
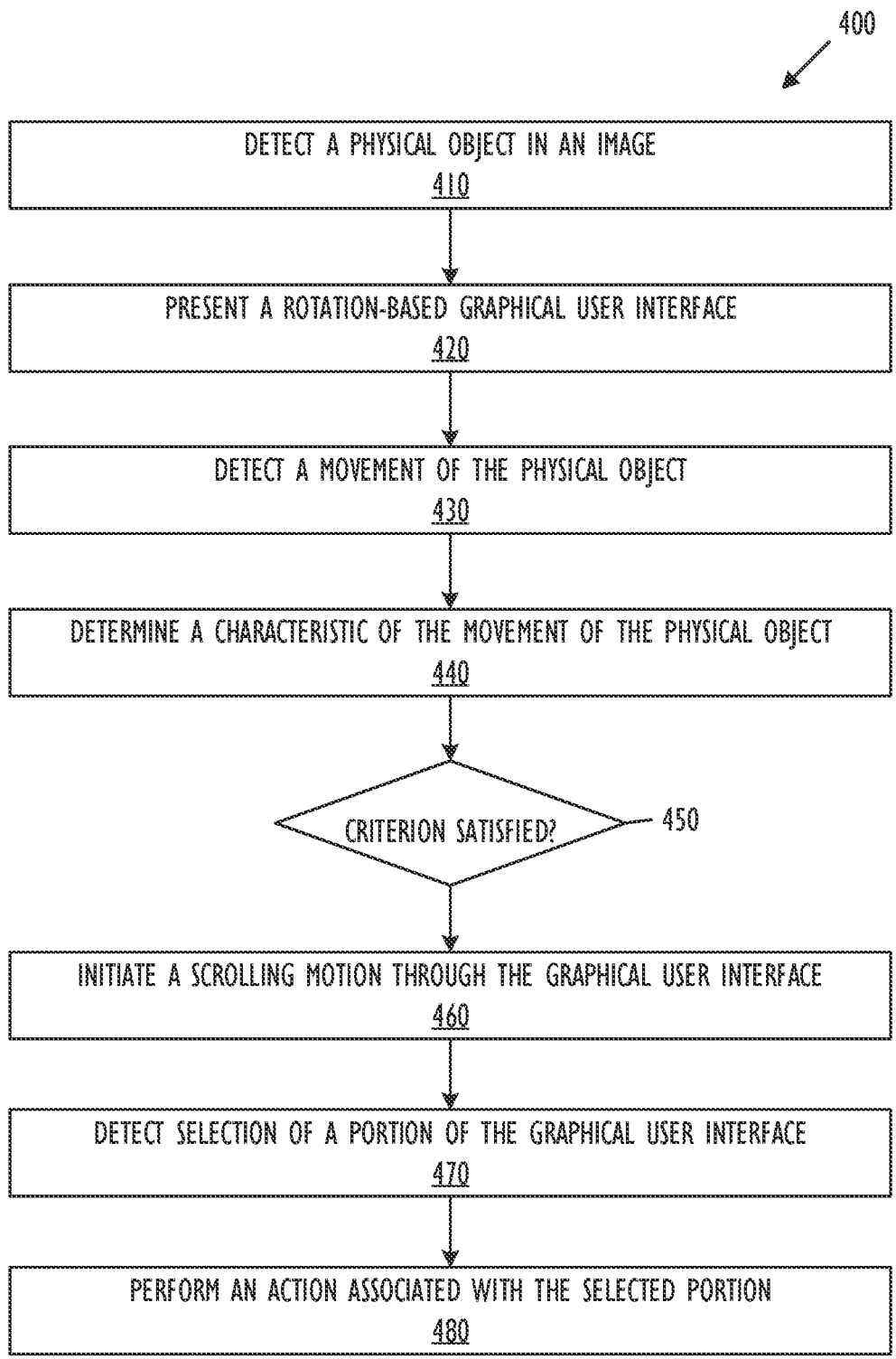
FIG. 4 shows, in flowchart form, an example process for scrolling through a graphical user interface based on a rotation-based user input, according to one or more embodiments.

FIG. 4 shows, in flowchart form, an example process for scrolling through a graphical user interface based on a rotation-based user input, according to one or more embodiments. For purposes of explanation, the following steps will be described in the context of FIGS. 1 and 2. However, it should be understood that the various actions may be taken by alternate components. In addition, the various actions may be performed in a different order. Further, some actions may be performed simultaneously, and some may not be required, or others may be added, according to various embodiments.

The flow chart begins at 410, where interface module 170 detects a physical object in an image. For example, interface module 170 may receive image data from camera 250 showing physical object 220 rotating. At 420, interface module 170 presents a rotation-based graphical user interface 120 on display 155. In some examples, the graphical user interface can be presented overlaid on the detected physical object such that it appears to cover or surround the physical object 220. For example, the graphical user interface can be presented in an extended reality view by compositing the interface with the image or video of the physical object 220 using an opaque display or displayed over a view of the physical object 220 using a see-through display. At 430, interface module 170 detects a movement of the physical object 220. At 440, interface module 170 determines a characteristic of the movement of the physical object. For example, interface module 170 may determine an angular velocity, angular acceleration, speed, direction, and the like of the physical object 220. Returning to the example of image data showing physical object 220, interface module 170 may identify the physical object 220 in each frame of the video and track the change in position of the physical object 220 in each frame to determine the angular velocity of the rotation-based user input. At 450, interface module 170 determines whether the movement characteristic determined in block 440 satisfies a criterion. For example, interface module 170 determines whether the angular velocity is greater than a threshold. In response to determining that the criterion is satisfied, interface module 170 continues to block 460 and initiates a scrolling motion through the graphical user interface. In some embodiments, interface module 170 may initiate the scrolling motion based on the movement characteristic. For example, interface module 170 may set a scrolling speed of the scrolling motion proportional to the angular velocity of the physical object 220, or set an inertial parameter for a decay in scrolling speed based on the angular acceleration of the physical object 220. In some embodiments, interface module 170 may set a scrolling speed of the scrolling motion equal to or a multiple of the angular velocity of the physical object 220.

At 470, interface module 170 detects selection of a portion of the graphical user interface. Selection of the portion of the graphical user interface may be another rotation-based user input, or may be a gaze-position user input, a gesture-based user input, and the like. At 480, interface module 170 performs an action associated with the selected portion of the graphical user interface. For example, the interface module 170 receives a gaze-position input indicative that the user's gaze is following a particular item in the graphical user interface as it is scrolled in block 470. In response, the interface module 170 may stop scrolling through the graphical user interface and select the particular item. As another example, the interface module 170 receives a gaze position input indicative that the user's gaze position is changing at a particular rate in block 470. In response to the particular rate of change for the gaze position satisfying a particular threshold, the interface module 170 may increase or decrease the scrolling speed. As another example, the second user input may be a gesture-based user input indicative of the user selecting a particular item in the graphical user interface. In response, the interface module 170 may select the particular item.

Figure 5:
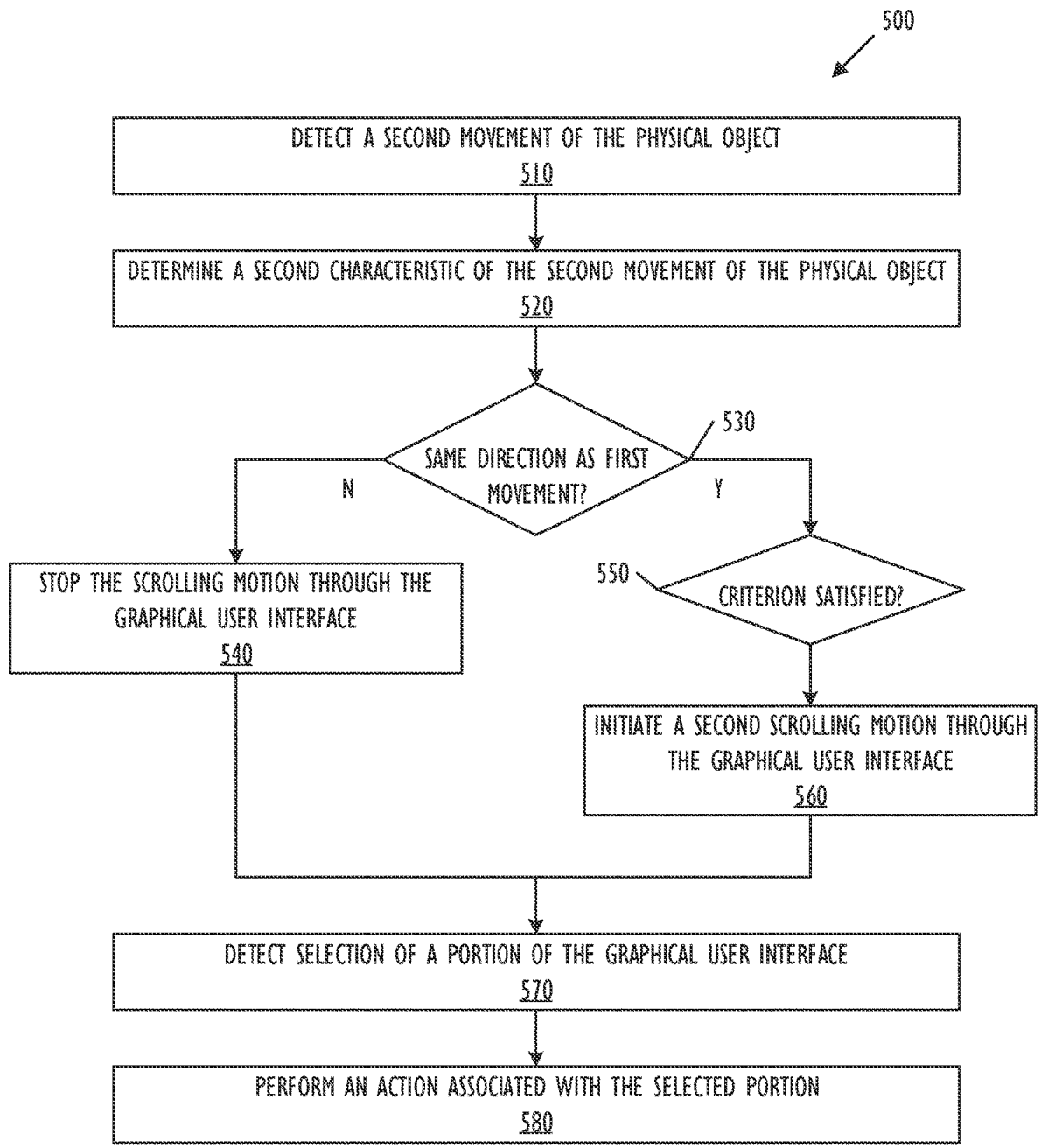
FIG. 5 shows, in flow chart form, a further example process for scrolling through a graphical user interface based on an additional rotation-based user input, according to one or more embodiments.

FIG. 5 shows, in flow chart form, a further example process 500 for scrolling through a graphical user interface based on an additional rotation-based user input, according to one or more embodiments. In one or more embodiments, the example process 500 may be performed in addition to process 400 described herein with reference to FIG. 4. For purposes of explanation, the following steps will be described in the context of FIGS. 1-2 and 4. However, it should be understood that the various actions may be taken by alternate components. In addition, the various actions may be performed in a different order. Further, some actions may be performed simultaneously, and some may not be required, or others may be added, according to various embodiments.

The flow chart begins at 510, where interface module 170 detects a second movement of the physical object 220. For example, interface module 170 may receive image data from camera 250 showing physical object 220 moving a second time. At 520, interface module 170 determines a second characteristic of the second movement of the physical object. As described herein with reference for FIG. 4, interface module 170 may identify the physical object 220 in each frame of the video and track the change in position of the physical object 220 in each frame to determine the direction and angular velocity of the rotation-based user input. At 530, interface module 170 determines whether a direction of the second movement is substantially the same direction as the first movement of the physical object 220. If interface module 170 determines the direction of the second movement is not substantially the same as the first movement, interface module 170 stops the scrolling motion through the graphical user interface at block 540. In some embodiments, if interface module 170 determines the direction of the second movement is not substantially the same as the first movement but the criterions is not satisfied, interface module 170 may continue the scrolling motion. For example, if the second movement is a slow rotation in the opposite direction of the first movement, interface module 170 continues the scrolling motion. If interface module 170 determines the direction of the second movement is substantially the same as the first movement, at block 550 interface module 170 determines whether the second movement characteristic determined in block 520 satisfies the criterion used in block 450. For example, interface module 170 determines whether an angular velocity of the second movement is greater than a threshold. In response to determining that the criterion is satisfied, interface module 170 continues to block 560 and initiates a second scrolling motion through the graphical user interface. In some examples, the characteristic of the second movement can be used to modify a current scrolling motion of the graphical user interface (e.g., as initiated at 460 and optionally modified using a decay property), such as by increasing the speed of scrolling or increasing the inertial parameter used for a decay in scrolling speed. From blocks 540 and 560, interface module 170 proceeds to block 570 and detects selection of a portion of the graphical user interface. Selection of the portion of the graphical user interface may be another rotation-based user input, or may be a gaze-position user input, a gesture-based user input, and the like, as described herein with reference to FIG. 4. At 580, interface module 170 performs an action associated with the selected portion of the graphical user interface.

Figure 6:
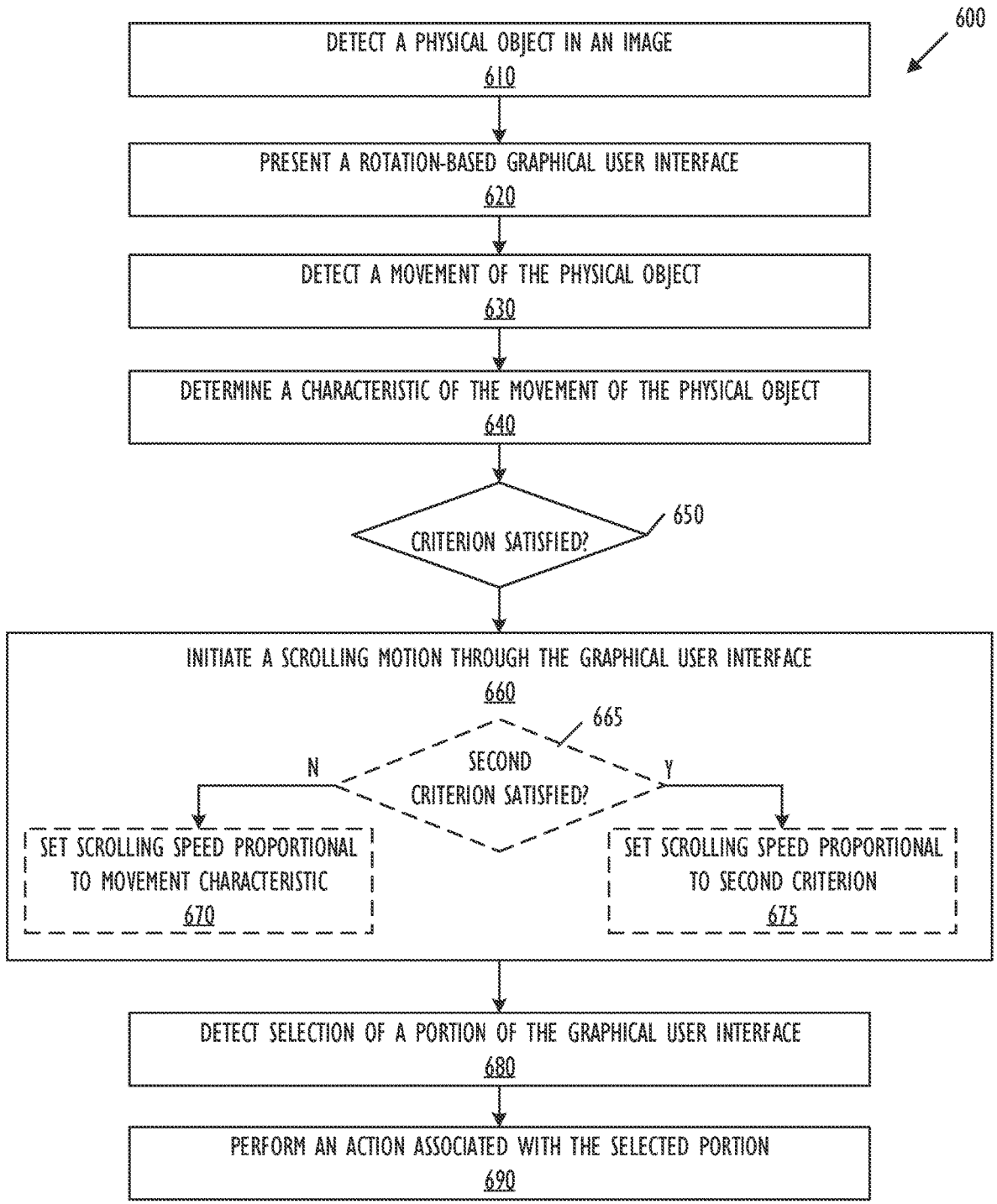
FIG. 6 shows, in flow chart form, another example process for scrolling through a graphical user interface based on a rotation-based user input including setting a scrolling speed, according to one or more embodiments.

FIG. 6 shows, in flow chart form, another example process for scrolling through a graphical user interface based on a rotation-based user input including setting a scrolling speed, according to one or more embodiments. In one or more embodiments, certain actions take place as part of initiating a scrolling motion through the graphical user interface. However, the various actions may take place in other locations within flow chart of FIG. 6. For purposes of explanation, the following steps will be described in the context of FIGS. 1-2. However, it should be understood that the various actions may be taken by alternate components. In addition, the various actions may be performed in a different order. Further, some actions may be performed simultaneously, and some may not be required, or others may be added, according to various embodiments.

Blocks 610-650 are substantially the same as blocks 410-450 described herein with reference to FIG. 4. In response to determining that the criterion is satisfied at block 650, interface module 170 continues to block 660 and initiates a scrolling motion through the graphical user interface. In some embodiments, initiating a scrolling motion includes blocks 665, 670, and/or 675. At block 665, interface module 170 determines whether the movement characteristic determined at block 640 satisfies a second criterion. For example, interface module 170 determines whether the angular velocity is greater than a second threshold that is itself greater than a first threshold associated with the criterion in block 650. In response to determining the second criterion is not satisfied, interface module 170 may set a scrolling speed for the scrolling motion to be proportional to the movement characteristic at block 670. In response to determining the second criterion is satisfied, interface module 170 may set a scrolling speed for the scrolling motion to be proportional to the second criterion at block 675. For example, the second criterion may be representative of a threshold scrolling speed proportion to the maximum speed at which the user's eye can follow the scrolling motion through the graphical user interface. In response to the second criterion not being satisfied, interface module 170 may set the scrolling speed proportional to the rotation speed of the physical object 220. In response to the second criterion being satisfied, interface module 170 may cap the scrolling speed proportional to the maximum speed at which the user's eye can follow the scrolling motion. Interface module 170 proceeds from either block 670 or 675 to block 680, where it detects selection of a portion of the graphical user interface. At 690, interface module 170 performs an action associated with the selected portion of the graphical user interface.

Figure 7:
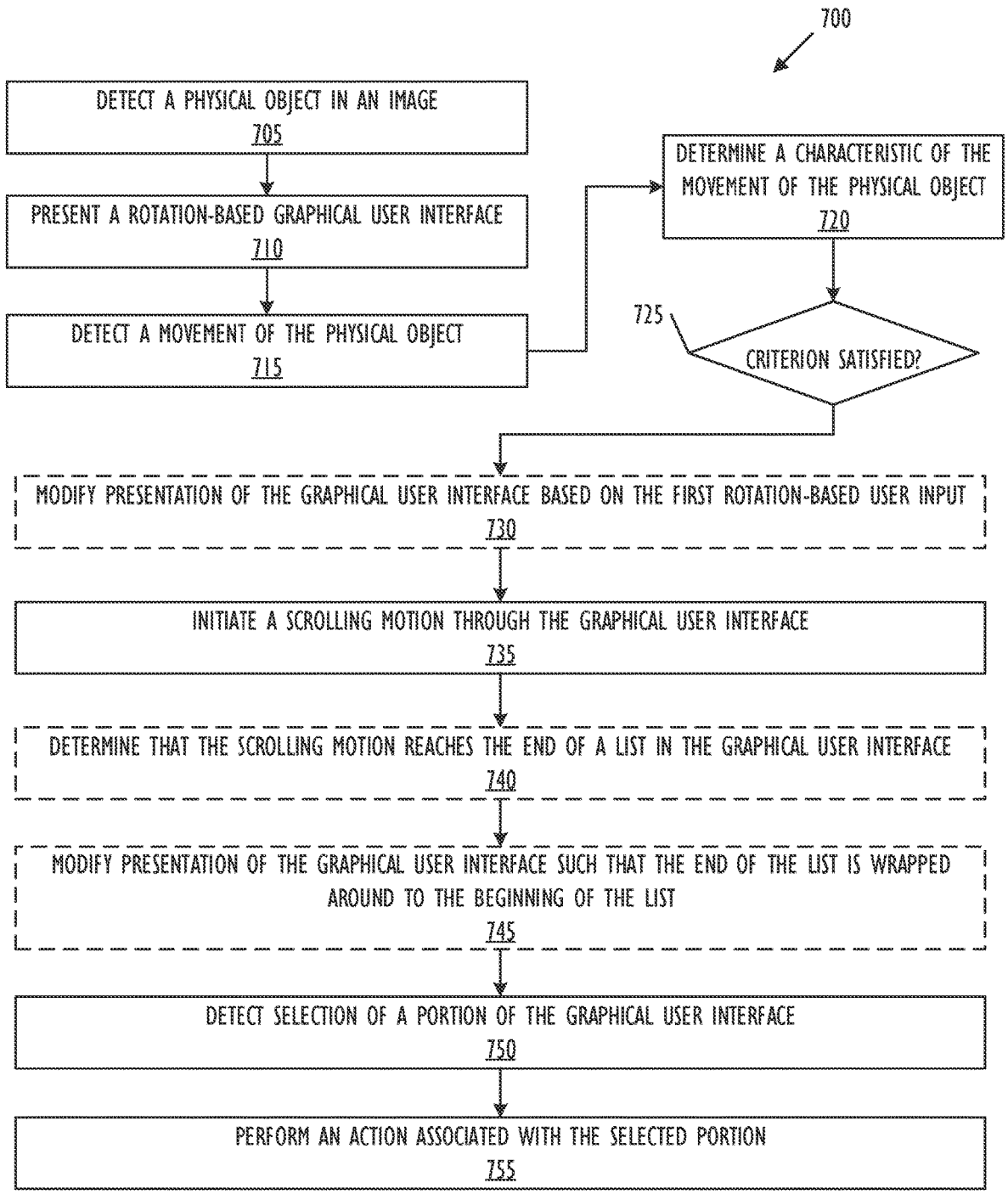
FIG. 7 shows, in flow chart form, another example process for scrolling through a graphical user interface based on a rotation-based user input including modifying presentation of the graphical user interface, according to one or more embodiments.

FIG. 7 shows, in flow chart form, another example process for scrolling through a graphical user interface based on a rotation-based user input including modifying presentation of the graphical user interface, according to one or more embodiments. In one or more embodiments, modifying presentation of the graphical user interface comprises additional functionality. However, the various actions may take place in other locations within flow chart of FIG. 7. For purposes of explanation, the following steps will be described in the context of FIGS. 1-4. However, it should be understood that the various actions may be taken by alternate components. In addition, the various actions may be performed in a different order. Further, some actions may be performed simultaneously, and some may not be required, or others may be added, according to various embodiments.

Blocks 705-725 are substantially the same as blocks 410-450 described herein with reference to FIG. 4. In response to determining that the criterion is satisfied at block 725, interface module 170 may optionally continue to block 730 and modify presentation of the graphical user interface based on the first rotation-based user input. In this example, the graphical user interface may include a list of items such as the list 320 shown in FIG. 3A. Interface module 170 may modify a display position or display size of the list 320 on display 155. At 735, interface module 170 initiates a scrolling motion through the list in the graphical user interface. Interface module 170 may optionally perform block 740, where it determines that the scrolling motion reaches the end of the list in the graphical user interface. Interface module 170 may then optionally modify presentation of the graphical user interface such that the end of the list wraps around to the beginning of the list at block 745, presenting a continuous list to a user. Although in this implementation the end of the list wraps around to the beginning at block 745, in other implementations the graphical user interface may be optionally modified to 'bounce' at the end of the list, load additional content to give the impressions of a never-ending list, change content such as changing from images to video thumbnails, and the like. At 750, interface module 170 detects selection of a portion of the graphical user interface. At 755, interface module 170 performs an action associated with the selected portion of the graphical user interface.

Figure 8:
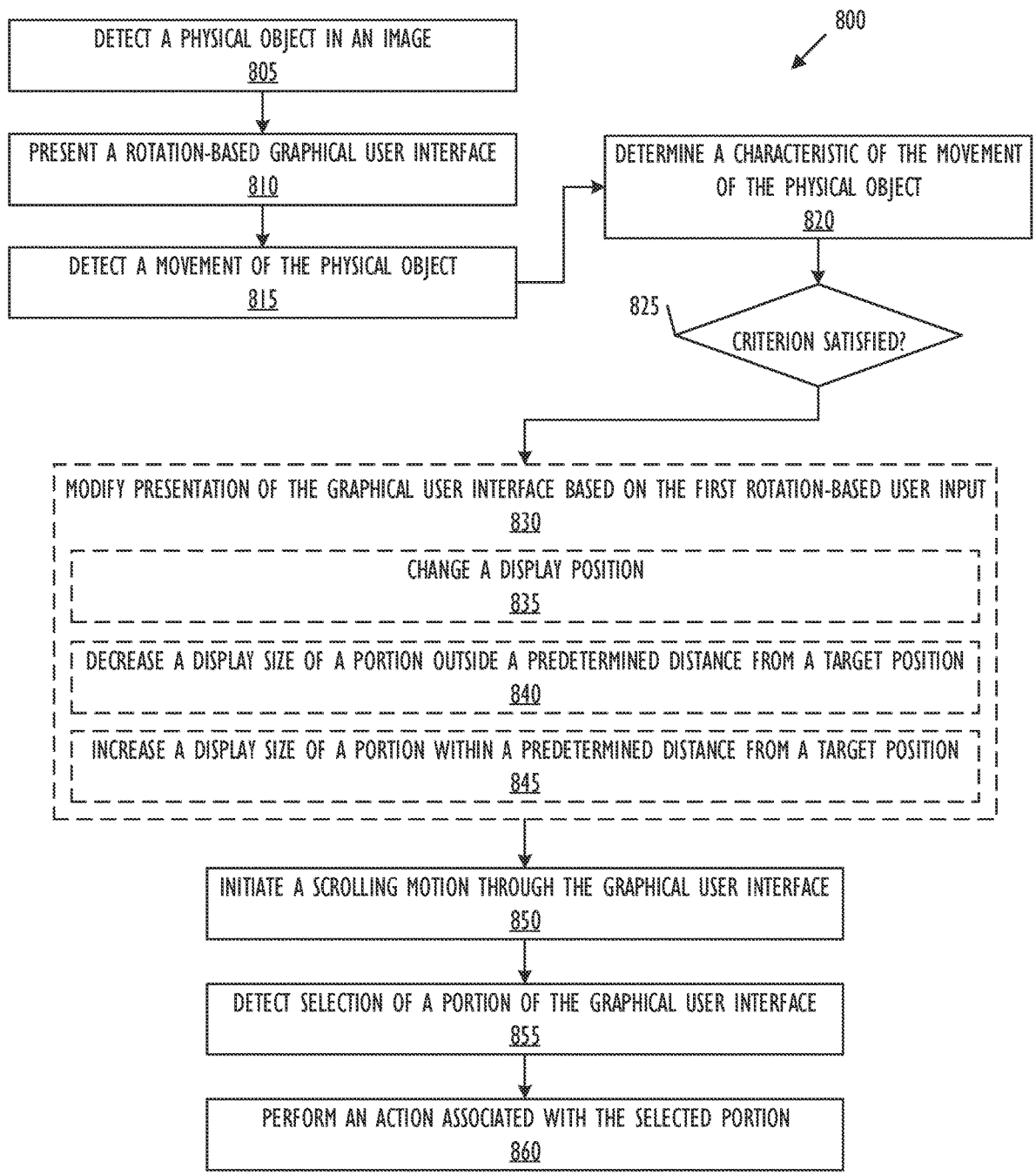
FIG. 8 shows, in flow chart form, another example process for scrolling through a graphical user interface based on a rotation-based user input including modifying presentation of the graphical user interface, according to one or more embodiments.

FIG. 8 shows, in flow chart form, another example process for scrolling through a graphical user interface based on a rotation-based user input including modifying presentation of the graphical user interface, according to one or more embodiments. In one or more embodiments, modifying presentation of the graphical user interface may optionally include changing a display position or display size of the graphical user interface. However, the various actions may take place in other locations within flow chart of FIG. 8. For purposes of explanation, the following steps will be described in the context of FIGS. 1-4. However, it should be understood that the various actions may be taken by alternate components. In addition, the various actions may be performed in a different order. Further, some actions may be performed simultaneously, and some may not be required, or others may be added, according to various embodiments.

Blocks 805-825 are substantially the same as blocks 410-450 described herein with reference to FIG. 4. In response to determining that the criterion is satisfied at block 825, interface module 170 may optionally continue to block 830 and modify presentation of the graphical user interface based on the first rotation-based user input. Modifying presentation of the graphical user interface may optionally include blocks 835, 840, and/or 845. At block 835, interface module 170 may move a display position of the graphical user interface. Returning to graphical user interface 310 showing a list 320, interface module 170 may move the graphical user interface 310 to a central position on display 155. In one or more embodiments in which display 155 comprises a pass-through display, interface module 170 may move the graphical user interface 310 to eye level. At block 840, interface module 170 may decrease a display size of a portion of the graphical user interface outside a predetermined distance from a target position, such as a cursor position or a gaze position. In graphical user interface 310 showing a list 320, list items 325A-B are outside a predetermined distance from a target position at list item 335 and displayed with a smaller text size. In graphical user interface 350 showing application icons 355-380, a target position may be at twelve o'clock, and interface module 170 may display the triangle-shaped icon 370 at a smaller size than the hexagon-shaped icon 355. At block 845, interface module 170 may increase a display size of a portion of the graphical user interface within a predetermined distance from a target position. In graphical user interface 310 showing a list 320, list item 335 is displayed with a larger text size. In graphical user interface 350 showing application icons 355-380, a target position may be at twelve o'clock, and interface module 170 may display the hexagon-shaped icon 355 at a larger size than the triangle-shaped icon 370.

At block 850, interface module 170 initiates a scrolling motion through the graphical user interface. In embodiments in which interface module 170 decreases or increases a display size of portions of the graphical user interface at blocks 840 or 845, interface module 170 may optionally update the presentation modifications while scrolling through the graphical user interface in block 850. Next, at block 855, interface module 170 may detect selection of a portion of the graphical user interface. As discussed previously herein with respect to FIG. 4, interface module 170 may detect selection of a portion of the graphical user interface based on another rotation-based user input, a gaze-position user input, a gesture-based user input, or the like. At 860, interface module 170 performs an action associated with the selected portion of the graphical user interface.

Figure 9:
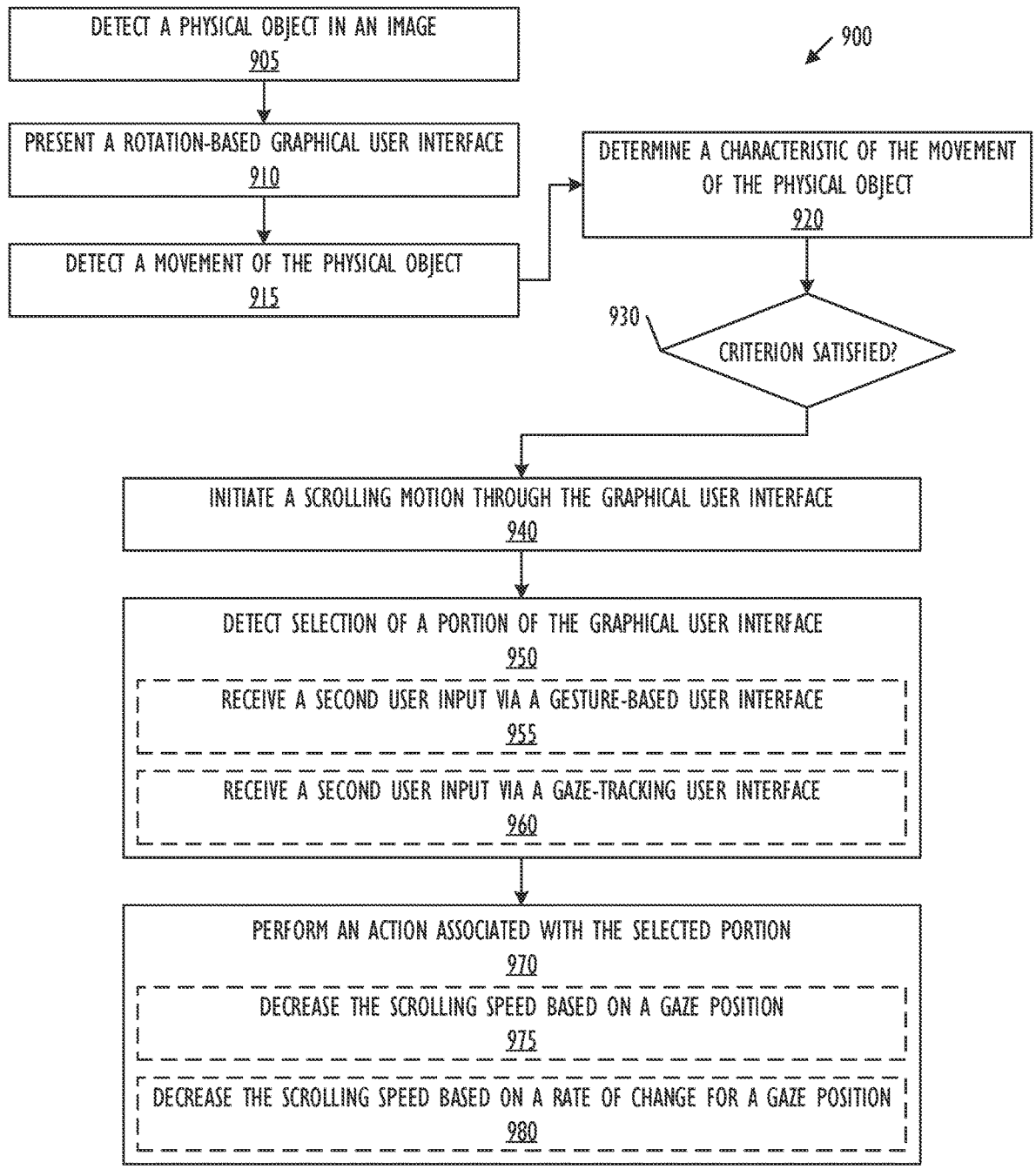
FIG. 9 shows, in flow chart form, another example process for scrolling through a graphical user interface based on a rotation-based user input including receiving a second user input via a gesture-based interface or a gaze-tracking interface and decreasing a scrolling speed based on the second user input, according to one or more embodiments.

FIG. 9 shows, in flow chart form, another example process for scrolling through a graphical user interface based on a rotation-based user input including receiving a second user input via a gesture-based interface or a gaze-tracking interface and decreasing a scrolling speed based on the second user input, according to one or more embodiments. In one or more embodiments, certain actions take place as part of detecting selection of a portion of the graphical user interface while other actions take place as part of performing an action associated with the selected portion of the graphical user interface. However, the various actions may take place in other locations within flow chart of FIG. 9. For purposes of explanation, the following steps will be described in the context of FIGS. 1-4. However, it should be understood that the various actions may be taken by alternate components. In addition, the various actions may be performed in a different order. Further, some actions may be performed simultaneously, and some may not be required, or others may be added, according to various embodiments.

Blocks 905-930 are substantially the same as blocks 410-450 described herein with reference to FIG. 4. In response to determining that the criterion is satisfied at block 930, interface module 170 may initiate a scrolling motion through the graphical user interface at block 940. Next, at block 950, interface module 170 may detect selection of a portion of the graphical user interface. Detecting selection of the portion may optionally include blocks 955 and/or 960. At block 955, interface module 170 receives a second user input via a gesture-based user interface indicative of the selection. For example, camera 250 may capture a video of a hand gesture made by a user, and an object recognition module or interface module 170 may identify the hand gesture from the video. As another example, the gesture-based user interface may be a touchscreen with predefined touch gestures, and the second user input may be a touch gesture. At block 960, interface module 170 receives a second user input via a gaze-tracking user interface indicative of the selection. Then at block 970, interface module 170 may perform an action associated with the selected portion of the graphical user interface. In embodiments in which a second user input is received from a gaze-tracking user interface at block 960, performing the action associated with the selected portion may optionally comprise blocks 975 and/or 980. At block 975, interface module 170 may decrease a scrolling speed of the scrolling motion based on a gaze position of the second user input. At block 980, interface module 170 may decrease the scrolling speed based on a rate of change for a gaze position of the second user input. For example, the rate of change for the user's gaze position may indicate that the user's vision cannot keep up with the scrolling speed, such that interface module 170 slows the scrolling speed in response to the rate of the change for the user's gaze position.

Figure 10:
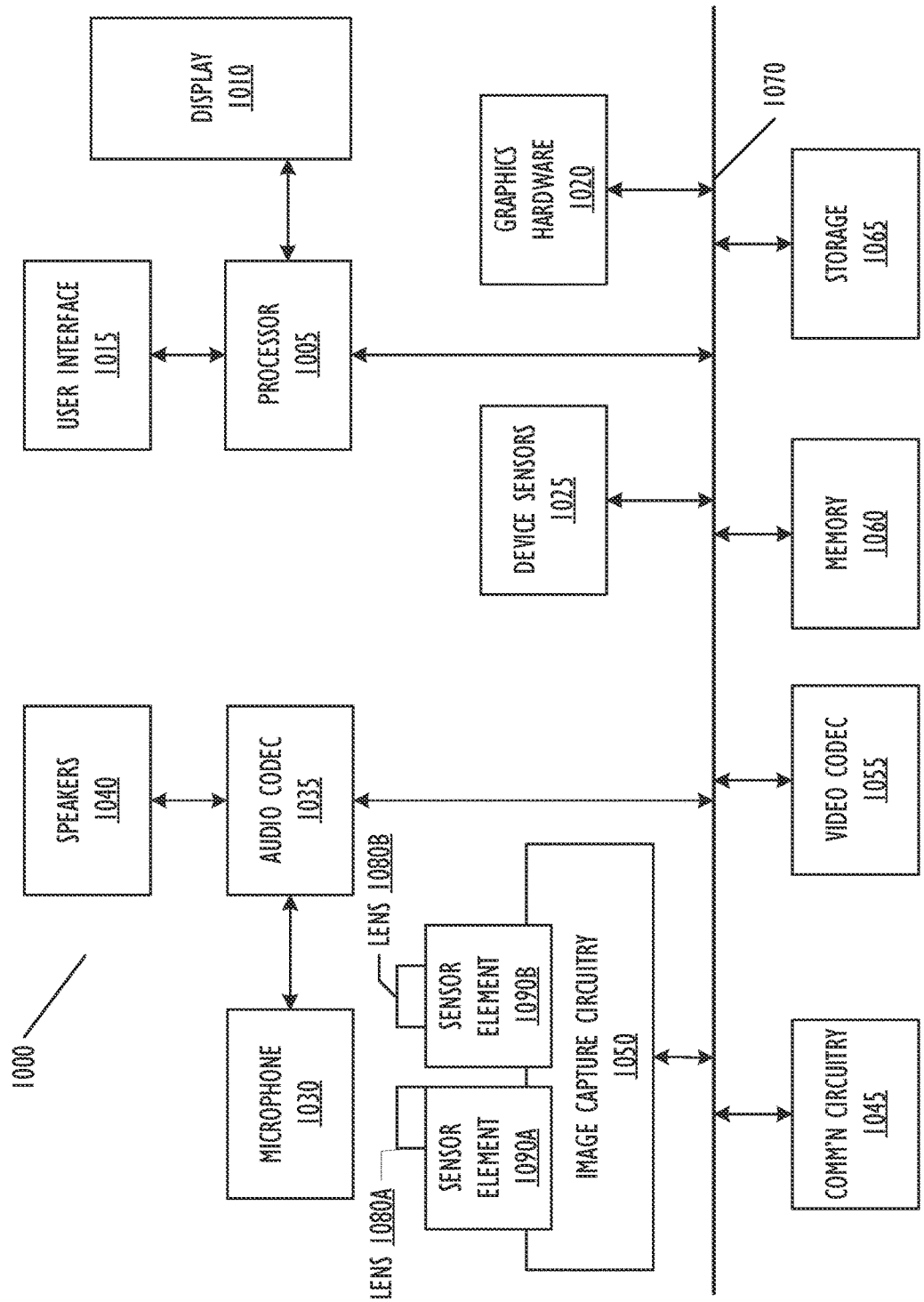
FIG. 10 shows, in block diagram form, a computer system in accordance with one or more embodiments.

Referring now to FIG. 10, a simplified functional block diagram of illustrative multifunction electronic device 1000 is shown according to one embodiment. Each of electronic devices may be a multifunctional electronic device, or may have some or all of the described components of a multifunctional electronic device described herein. Multifunction electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, digital image capture circuitry 1050 (e.g., including camera system) video codec(s) 1055 (e.g., in support of digital image capture unit), memory 1060, storage device 1065, and communications bus 1070. Multifunction electronic device 1000 may be, for example, a digital camera or a personal electronic device such as a personal digital assistant (PDA), personal music player, mobile telephone, or a tablet computer.

Processor 1005 may execute instructions necessary to carry out or control the operation of many functions performed by device 1000 (e.g., such as the generation and/or processing of images as disclosed herein). Processor 1005 may, for instance, drive display 1010 and receive user input from user interface 1015. User interface 1015 may allow a user to interact with device 1000. For example, user interface 1015 can take a variety of forms, such as a button, keypad, dial, a click wheel, keyboard, display screen and/or a touch screen. Processor 1005 may also, for example, be a system-on-chip such as those found in mobile devices and include a dedicated graphics processing unit (GPU). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 to process graphics information. In one embodiment, graphics hardware 1020 may include a programmable GPU.

Image capture circuitry 1050 may include two (or more) lens assemblies 1080A and 1080B, where each lens assembly may have a separate focal length. For example, lens assembly 1080A may have a short focal length relative to the focal length of lens assembly 1080B. Each lens assembly may have a separate associated sensor element 1090. Alternatively, two or more lens assemblies may share a common sensor element. Image capture circuitry 1050 may capture still and/or video images. Output from image capture circuitry 1050 may be processed, at least in part, by video codec(s) 1055 and/or processor 1005 and/or graphics hardware 1020, and/or a dedicated image processing unit or pipeline incorporated within circuitry 1065. Images so captured may be stored in memory 1060 and/or storage 1065.

Sensor and camera circuitry 1050 may capture still and video images that may be processed in accordance with this disclosure, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005 and graphics hardware 1020 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to tangibly retain computer program instructions or code organized into one or more modules and written in any desired computer programming language. When executed by, for example, processor 1005 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 4-9 or the arrangement of elements shown in FIGS. 1-3 and 10 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
   detecting a physical object in image data capturing a physical environment;
   presenting a rotation-based graphical user interface in accordance with the detected physical object, wherein the rotation-based graphical user interface is composited on a view of the physical object such that the rotation-based graphical user interface appears to at least partially surround the physical object in an extended reality view;
   detecting, based on the image data, a first rotational movement of the physical object;
   determining first movement characteristics of the first rotational movement of the physical object based on the image data, wherein the first movement characteristics comprise a direction and an angular velocity of the first rotational movement across multiple frames of the image data; and
   initiating a scrolling motion causing a presentation of content comprised in the rotation-based graphical user interface to appear to rotate around the physical object in the extended reality view in accordance with the first movement characteristics satisfying a first criterion, wherein the scrolling motion is performed at a rate determined based on the angular velocity, wherein, after initiation of the scrolling motion, the rotation-based graphical user interface continues to scroll at a rate that is irrespective of a continued motion of the physical object until an additional criterion is satisfied.

2. The method of claim 1, wherein initiating the scrolling motion comprises initiating the scrolling motion at a scrolling speed proportional to the angular velocity of the first rotational movement.

3. The method of claim 2, further comprising limiting the scrolling speed to a scrolling speed proportional to a second criterion in accordance with the first movement characteristics satisfying the second criterion.

4. The method of claim 1, further comprising:
   detecting a second rotational movement of the physical object;
   determining second movement characteristics of the second rotational movement of the physical object, wherein the second movement characteristics comprises a second direction of the second rotational movement of the physical object that is opposite the direction of the first rotational movement of the physical object; and
   stopping the scrolling motion through the rotation-based graphical user interface in accordance with the second movement characteristics.

5. The method of claim 1, further comprising:
   detecting a second rotational movement of the physical object;
   determining second movement characteristics of the second rotational movement of the physical object, wherein the second movement characteristics comprise a second direction of the second rotational movement of the physical object that is substantially the same as the direction of the first rotational movement of the physical object; and initiating a second scrolling motion through the rotation-based graphical user interface in accordance with the second movement characteristics satisfying the first criterion.

6. The method of claim 1, wherein determining the first movement characteristics of the physical object comprises determining an inertial parameter, and wherein initiating the scrolling motion further comprises initiating the scrolling motion in accordance with the inertial parameter.

7. The method of claim 1, wherein the rotation-based graphical user interface comprises a list, wherein the method further comprises:

determining that the scrolling motion through the rotation-based graphical user interface reaches an end of the list; and modifying presentation of the rotation-based graphical user interface such that the end of the list is wrapped around to a beginning of the list.

8. The method of claim 1, further comprising:
receiving an input via a gesture-based user interface.

9. The method of claim 1, further comprising:
receiving an input via a gaze-tracking user interface.

10. The method of claim 9, further comprising, in response to detecting selection of a portion of the rotation-based graphical user interface, decreasing a scrolling speed based on a gaze position.

11. The method of claim 9, further comprising, in response to detecting selection of a portion of the rotation-based graphical user interface, decreasing a scrolling speed based on a rate of change for a gaze position.

12. The method of claim 1, further comprising modifying presentation of the rotation-based graphical user interface based on the first movement characteristics.

13. The method of claim 12, wherein modifying presentation of the rotation-based graphical user interface comprises:

increasing a display size of a portion of the rotation-based graphical user interface within a predetermined distance from a target position; and decreasing a display size of a portion of the rotation-based graphical user interface outside the predetermined distance from the target position.

14. The method of claim 12, wherein modifying presentation of the rotation-based graphical user interface comprises changing a display position of the rotation-based graphical user interface based on the first movement characteristics.

15. A non-transitory computer readable medium comprising computer code, executable by one or more processors to:

detect a physical object in image data capturing a physical environment;

present a rotation-based graphical user interface in accordance with the detected physical object, wherein the rotation-based graphical user interface is composited on a view of the physical object such that the rotation-based graphical user interface appears to at least partially surround the physical object in an extended reality view;

detect, based on the image data, a first rotational movement of the physical object;

determine first movement characteristics of the first rotational movement of the physical object based on the image data, wherein the first movement characteristics comprise a direction and an angular velocity of the first rotational movement across multiple frames of the image data; and initiate a scrolling motion causing a presentation of content comprised in the rotation-based graphical user interface to appear to rotate around the physical object in the extended reality view in accordance with the first movement characteristics satisfying a first criterion, wherein the scrolling motion is performed at a rate determined based on the angular velocity, wherein, after initiation of the scrolling motion, the rotation-based graphical user interface continues to scroll at a rate that is irrespective of a continued motion of the physical object until an additional criterion is satisfied.

16. The non-transitory computer readable medium of claim 15, wherein the computer code to initiate the scrolling motion comprises computer code executable by one or more processors to initiate the scrolling motion at a scrolling speed proportional to the angular velocity of the first rotational movement.

17. The non-transitory computer readable medium of claim 16, further comprising computer code executable by one or more processors to limit the scrolling speed to a scrolling speed proportional to a second criterion in accordance with the first movement characteristics satisfying the second criterion.

18. The non-transitory computer readable medium of claim 15, further comprising computer code executable by one or more processors to receive an input via a gesture-based user interface.

19. The non-transitory computer readable medium of claim 15, further comprising computer code executable by one or more processors to receive an input via a gaze-tracking user interface.

20. The non-transitory computer readable medium of claim 19, further comprising computer code executable by one or more processors to, in response to detecting selection of a portion of the rotation-based graphical user interface, decrease a scrolling speed based on a gaze position.

21. The non-transitory computer readable medium of claim 19, further comprising computer code executable by one or more processors to, in response to detecting selection of a portion of the rotation-based graphical user interface, decrease a scrolling speed based on a rate of change for a gaze position.

22. The non-transitory computer readable medium of claim 15, further comprising computer code executable by one or more processors to:

detect a second rotational movement of the physical object;

determine second movement characteristics of the second rotational movement of the physical object, wherein the second movement characteristics comprise a second direction of the second rotational movement of the physical object that is opposite the direction of the first rotational movement of the physical object; and stop the scrolling motion through the rotation-based graphical user interface in accordance with the second movement characteristics.

23. The non-transitory computer readable medium of claim 15, further comprising computer code executable by one or more processors to:

detect a second rotational movement of the physical object;

determine second movement characteristics of the second rotational movement of the physical object, wherein the second movement characteristics comprise a second direction of the second rotational movement of the physical object that is substantially the same as the direction of the first rotational movement of the physical object; and initiate a second scrolling motion through the rotation-based graphical user interface in accordance with the second movement characteristics satisfying the first criterion.

24. The non-transitory computer readable medium of claim 15, wherein the computer code to determine the first movement characteristics of the physical object comprises computer code executable by one or more processors to determine an inertial parameter, and wherein the computer code to initiate the scrolling motion further comprises computer code executable by one or more processors to initiate the scrolling motion in accordance with the inertial parameter.

25. The non-transitory computer readable medium of claim 15, wherein the rotation-based graphical user interface comprises a list, the non-transitory computer readable medium further comprising computer code executable by one or more processors to:

determine that the scrolling motion through the rotation-based graphical user interface reaches an end of the list; and modify presentation of the rotation-based graphical user interface such that the end of the list is wrapped around to a beginning of the list.

26. The non-transitory computer readable medium of claim 15, further comprising computer code executable by one or more processors to modify presentation of the rotation-based graphical user interface based on the first movement characteristics.

27. The non-transitory computer readable medium of claim 26, wherein the computer code to modify presentation of the rotation-based graphical user interface comprises computer code executable by one or more processors to:

increase a display size of a portion of the rotation-based graphical user interface within a predetermined distance from a target position; and decrease a display size of a portion of the rotation-based graphical user interface outside the predetermined distance from the target position.

28. The non-transitory computer readable medium of claim 26, wherein the computer code to modify presentation of the rotation-based graphical user interface comprises computer code executable by one or more processors to change a display position of the rotation-based graphical user interface based on the first movement characteristics.

29. A system, comprising:
one or more processors; and
one or more computer readable media comprising computer readable code executable by the one or more processors to:
  detect a physical object in image data capturing a physical environment;
  present a rotation-based graphical user interface in accordance with the detected physical object, wherein the rotation-based graphical user interface is composited on a view of the physical object such that the rotation-based graphical user interface appears to at least partially surround the physical object in an extended reality view;
  detect, based on the image data, a first rotational movement of the physical object;
  determine first movement characteristics of the first rotational movement of the physical object based on the image data, wherein the first movement characteristics comprise a direction and an angular velocity of the rotational movement across multiple frames of the image data; and
  initiate a scrolling motion causing a presentation of content comprised in the rotation-based graphical user interface to appear to rotate around the physical object in the extended reality view in accordance with the first movement characteristics satisfying a first criterion, wherein the scrolling motion is performed at a rate determined based on the angular velocity, wherein, after initiation of the scrolling motion, the rotation-based graphical user interface continues to scroll at a rate that is irrespective of a continued motion of the physical object until an additional criterion is satisfied.

30. The system of claim 29, wherein the computer readable code to initiate the scrolling motion comprises computer readable code executable by the one or more processors to initiate the scrolling motion at a scrolling speed proportional to the angular velocity of the first rotational movement.

31. The system of claim 30, wherein the one or more computer readable media further comprise computer readable code executable by the one or more processors to limit the scrolling speed to a scrolling speed proportional to a second criterion in accordance with the first movement characteristics satisfying the second criterion.

32. The system of claim 29, wherein the one or more computer readable media further comprise computer readable code executable by the one or more processors to:
  detect a second rotational movement of the physical object;
  determine second movement characteristics of the second rotational movement of the physical object, wherein the second movement characteristics comprises a second direction of the second rotational movement of the physical object that is opposite the direction of the first rotational movement of the physical object; and
  stop the scrolling motion through the rotation-based graphical user interface in accordance with the second movement characteristics.

33. The system of claim 29, wherein the one or more computer readable media further comprise computer readable code executable by the one or more processors to:
  detect a second rotational movement of the physical object;
  determine second movement characteristics of the second rotational movement of the physical object, wherein the second movement characteristics comprise a second direction of the second rotational movement of the physical object that is substantially the same as the direction of the first rotational movement of the physical object; and
  initiate a second scrolling motion through the rotation-based graphical user interface in accordance with the second movement characteristics satisfying the first criterion.

34. The system of claim 29, wherein the computer readable code to determine the first movement characteristics of the first rotational movement of the physical object comprises computer readable code executable by the one or more processors to determine an inertial parameter, and wherein the computer readable code to initiate the scrolling motion comprises computer readable code executable by the one or more processors to initiate the scrolling motion in accordance with the inertial parameter.

35. The system of claim 29, wherein the rotation-based graphical user interface comprises a list, wherein the one or more computer readable media further comprises computer readable code executable by the one or more processors to:
 determine that the scrolling motion through the rotation-based graphical user interface reaches an end of the list; and
 modify presentation of the rotation-based graphical user interface such that the end of the list is wrapped around to a beginning of the list.

36. The system of claim 29, further comprising computer readable code executable by the one or more processors to receive an input via a gesture-based user interface.

37. The system of claim 29, further comprising computer readable code executable by the one or more processors to receive an input via a gaze-tracking user interface.

38. The system of claim 37, further comprising computer code executable by one or more processors to, in response to detecting selection of a portion of the rotation-based graphical user interface, decrease a scrolling speed based on a gaze position.

39. The system of claim 37, further comprising computer code executable by one or more processors to, in response to detecting selection of a portion of the rotation-based graphical user interface, decrease a scrolling speed based on a rate of change for a gaze position.

40. The system of claim 29, wherein the one or more computer readable media further comprise computer readable code executable by the one or more processors to modify presentation of the rotation-based graphical user interface based on the first movement characteristics.

41. The system of claim 40, wherein the computer readable code to modify presentation of the rotation-based graphical user interface comprises computer readable code executable by the one or more processors to:
 increase a display size of a portion of the rotation-based graphical user interface within a predetermined distance from a target position; and
 decrease a display size of a portion of the rotation-based graphical user interface outside the predetermined distance from the target position.

42. The system of claim 40, wherein the computer readable code to modify presentation of the rotation-based graphical user interface comprises computer readable code executable by the one or more processors to change a display position of the rotation-based graphical user interface based on the first movement characteristics.

\* \* \* \* \*